United States Patent
Birgden et al.

(10) Patent No.: US 6,969,038 B1
(45) Date of Patent: Nov. 29, 2005

(54) VEHICLE EXTERNAL MIRROR ASSEMBLY AND METHOD OF MANUFACTURE

(75) Inventors: Ingmar Manfred Birgden, Glenalta (AU); Garry Gordon Leslie Fimeri, Morphett Vale (AU); Robert William Gilbert, Willunga (AU); Duncan William Nash, Happy Valley (AU)

(73) Assignee: Schefenacker Vision Systems Australia Pty Ltd, Lonsdale (AU)

( * ) Notice: Subject to any disclaimer, the term of this patent is extended or adjusted under 35 U.S.C. 154(b) by 0 days.

(21) Appl. No.: 09/890,619

(22) PCT Filed: Feb. 3, 2000

(86) PCT No.: PCT/AU00/00054

§ 371 (c)(1),
(2), (4) Date: Sep. 28, 2001

(87) PCT Pub. No.: WO00/46072

PCT Pub. Date: Aug. 10, 2000

(30) Foreign Application Priority Data

Feb. 5, 1999 (AU) ..................................... PP8490

(51) Int. Cl.⁷ ............................................... A47F 7/14
(52) U.S. Cl. ................... 248/475.1; 248/476; 248/479; 248/466; 248/289.31; 359/841; 359/872
(58) Field of Search ............................... 359/841, 872; 248/479, 488.1, 484, 476, 466, 900, 549, 248/289.31, 475.1, 487

(56) References Cited

U.S. PATENT DOCUMENTS 3,375,053 A * 3/1968 Ward ........................... 359/864
3,383,152 A * 5/1968 Ward ........................... 359/514
3,408,136 A * 10/1968 Travis ......................... 359/864
3,448,553 A * 6/1969 Herr et al. .................... 359/883
3,508,815 A * 4/1970 Scheitlin et al. ............. 359/883
3,776,618 A * 12/1973 Perison, Sr. ................. 359/870
5,005,797 A * 4/1991 Maekawa et al. ........... 248/479
5,786,948 A * 7/1998 Gold ........................... 359/838
6,206,553 B1 * 3/2001 Boddy et al. ................ 362/494
6,382,804 B1 * 5/2002 Lang et al. .................. 359/872
6,390,634 B1 * 5/2002 Lang et al. .................. 359/871

FOREIGN PATENT DOCUMENTS

| CA | 2198267 | 8/1998 |
| DE | 25 37 867 A1 | 3/1977 |
| DE | 2732489 A 1 | 2/1979 |
| DE | 27 40 189 A1 | 3/1979 |
| DE | 28 20 883 A1 | 11/1979 |
| DE | 44 29 604 A1 | 2/1996 |
| FR | 2 633 568 A1 | 1/1990 |
| GB | 20 48 191 A1 | 12/1980 |

* cited by examiner

Primary Examiner—Kimberly Wood
(74) Attorney, Agent, or Firm—Warn, Hoffmann, Miller & LaLone, P.C.

(57) ABSTRACT

A vehicle external mirror assembly (10) comprises three main parts: a vehicle-to-mirror assembly attachment bracket (15), a mirror housing (20) and a mirror (41). Housing (20) comprises a thin molded external plastic shell (50) and a foam core (21), the foam anchoring and supporting the shell. A load diffuser (45) may be positioned within foam (21) to reduce the maximum tensile and compressive stresses within the foam (21). Attachment bracket (15) is of a similar construction with a thin shell (15) internal foam (18) and load diffuser (16).

32 Claims, 6 Drawing Sheets

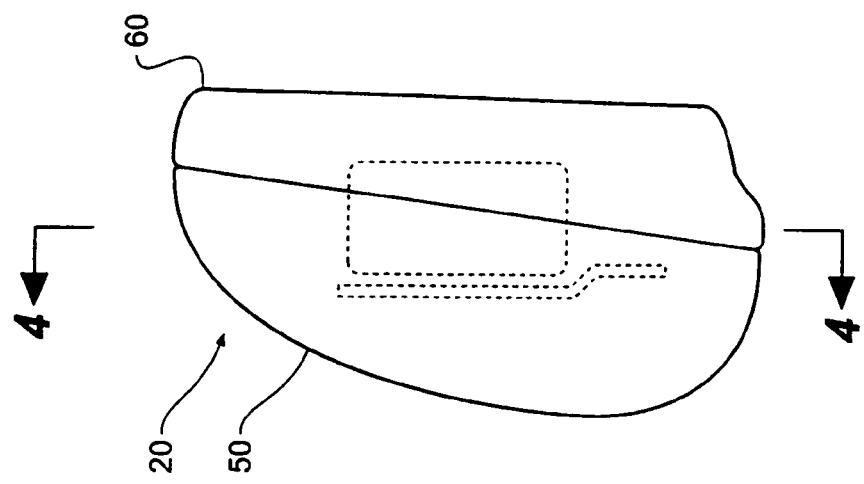
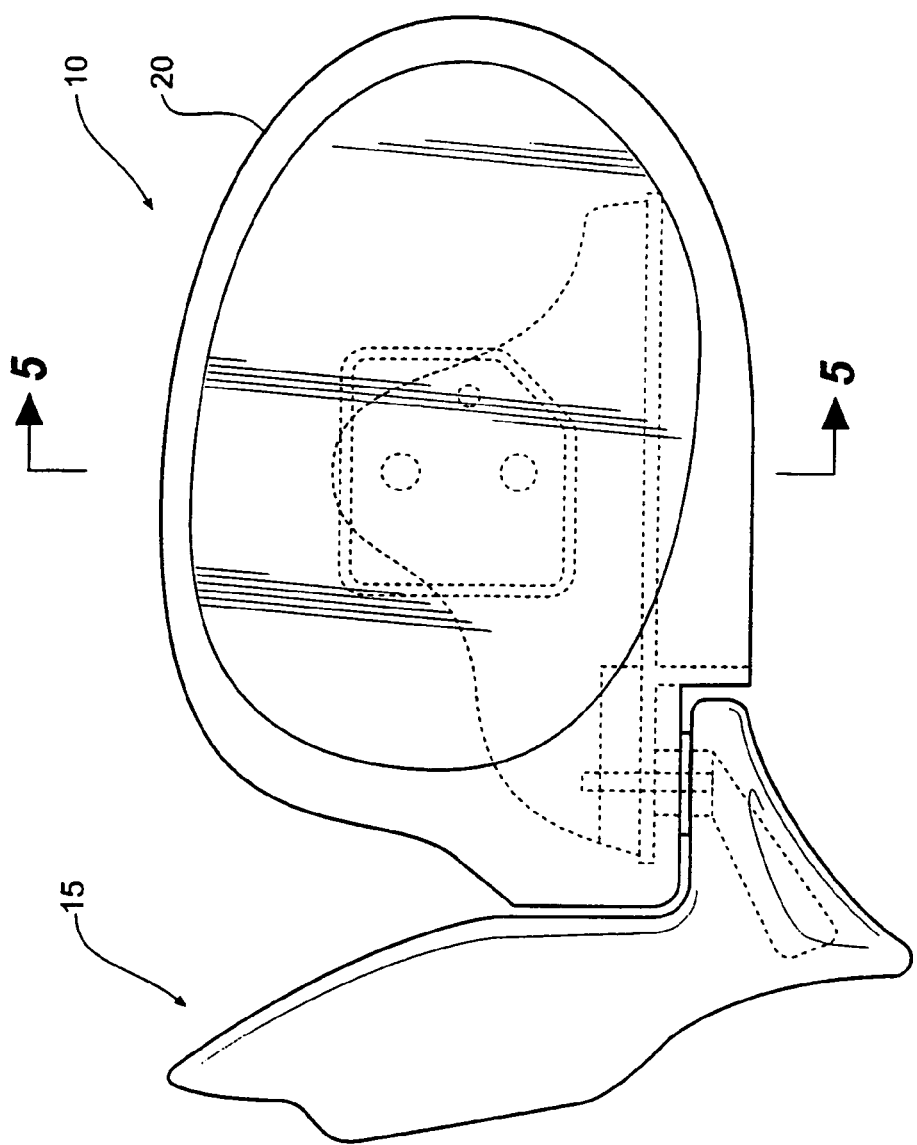

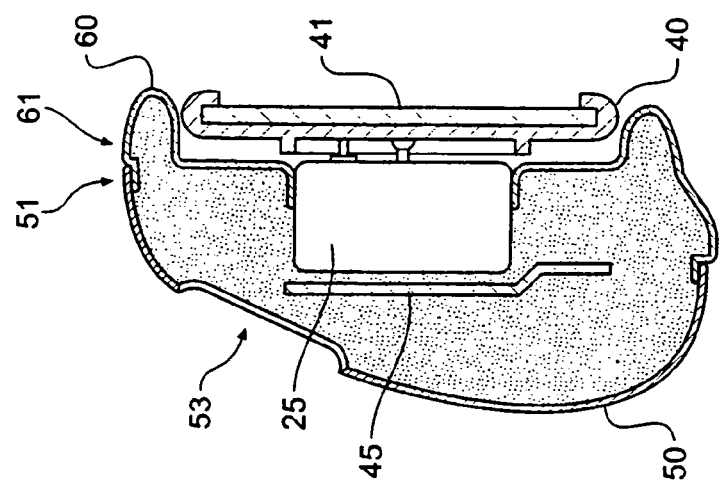
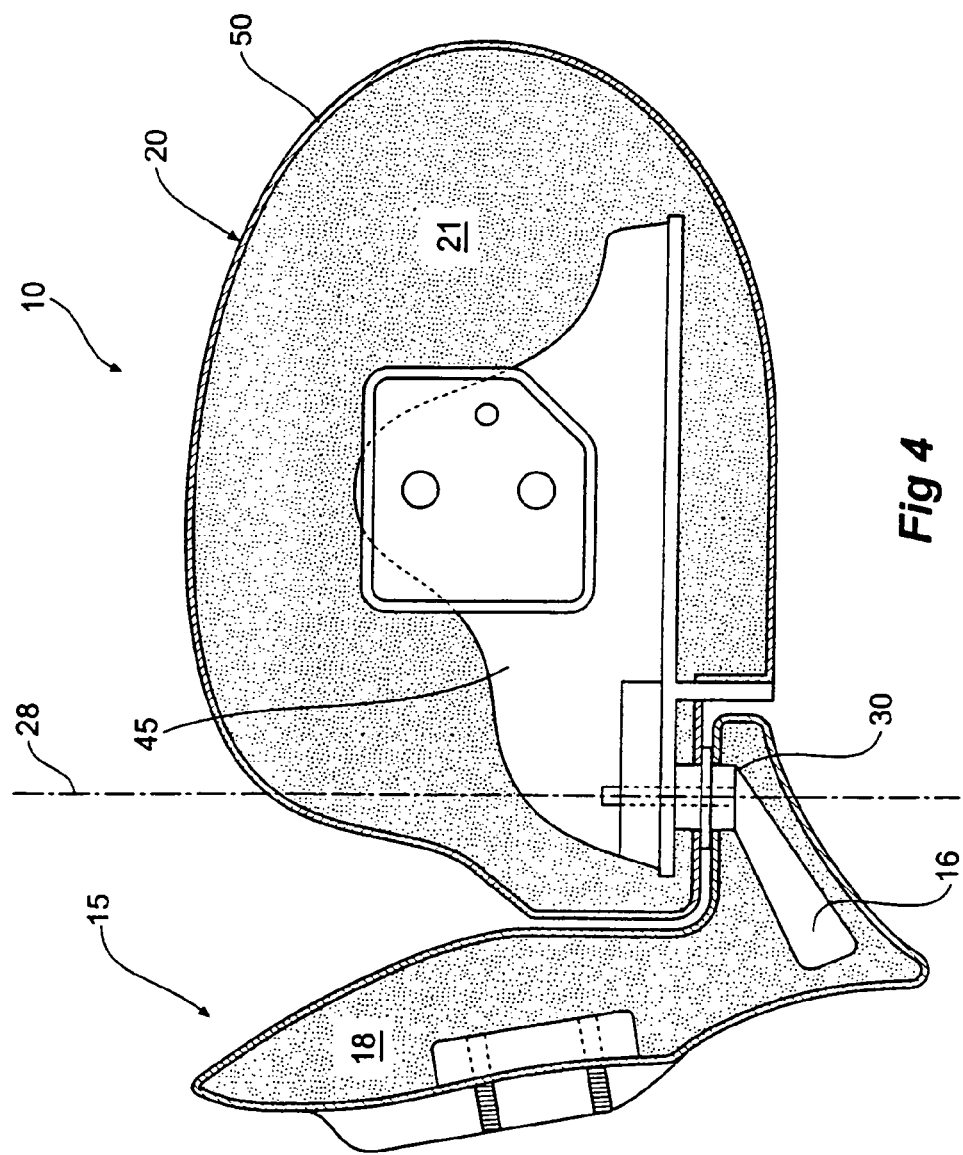

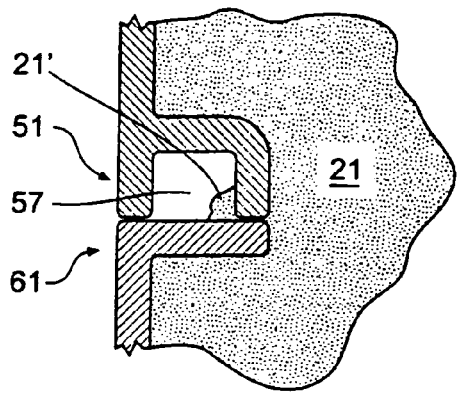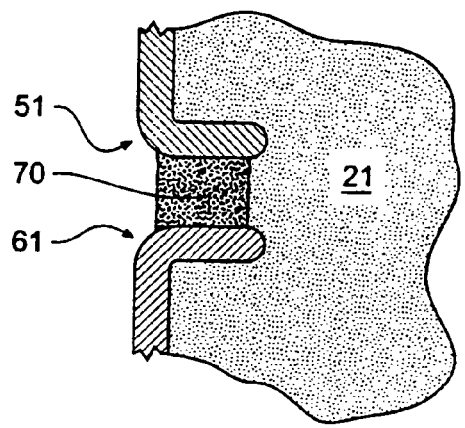
Fig 8　　　　Fig 9
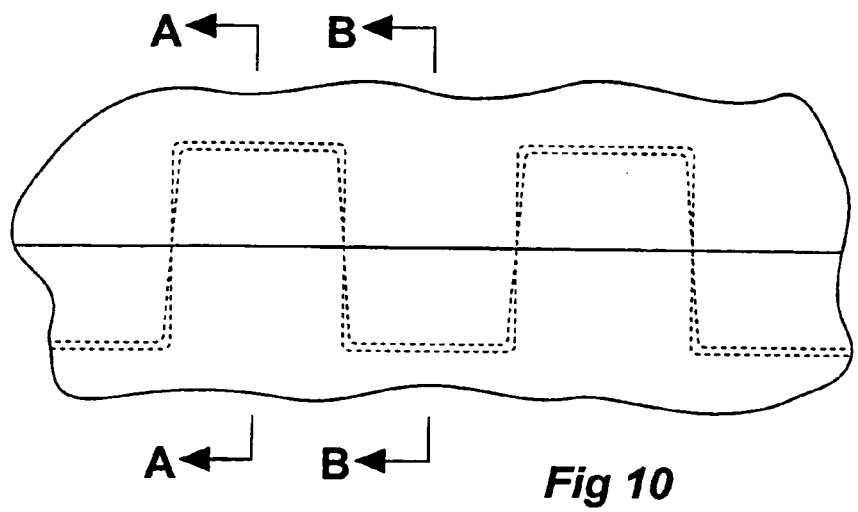
Fig 10
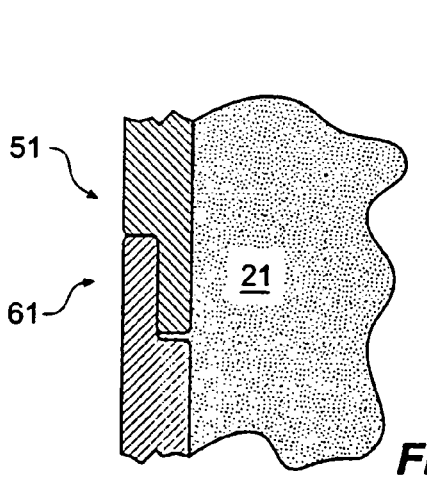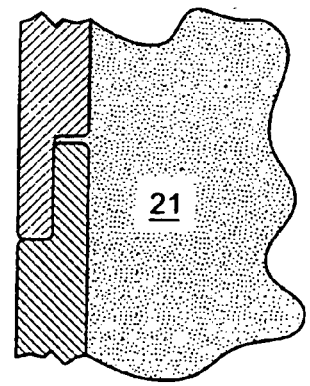
Fig 11　　　　Fig 12

VEHICLE EXTERNAL MIRROR ASSEMBLY AND METHOD OF MANUFACTURE

FIELD OF THE INVENTION

The present invention relates to vehicle mirror housings and in particular to vehicle external mirror housings formed from plastic.

BACKGROUND OF THE INVENTION

Vehicle external mirror housings have evolved from simple mounting structures for "wing mirrors" to receptacles for mirrors performing many functions and housing a number of components. For instance, mirror housings commonly house servomotors which are capable of rotating mirrors mounted to the housings about two axes so as to enable the driver to adjust his or her field of rear view. Also external mirror housings commonly are pivotable inward towards the vehicle side in the event of a collision with a solid object and, in some circumstances, automatically upon parking the vehicle to reduce the protrusions from the vehicle's side and its maximum width. Furthermore, equipment such as heaters, antennas and lights may also be supported by the modern external mirror housing. External mirror housings must also be shaped so as to minimize wind noise and so as to minimize drag, while providing an aesthetically pleasing external appearance. As a result, mirror housings have become larger, heavier, more complex and therefore more expensive to produce.

To achieve the functionality and performance required at a reasonable cost, vehicle external mirror housings are usually produced in plastic using injection molding techniques. Typically housings are made from shells of injection molded plastics having wall thickness in the range of 2 to 3 millimeters. Such a wall thickness has been found to provide adequate strength and rigidity.

Many different mirror housing constructions are known. Mirror housings may be formed by two mating structural components, by one cosmetic component and one structural component, or from a single cosmetic/structural component. However generally, mirror housings are produced from at least two mating components, which, when joined, form a hollow shell. Mating bosses, molded into the shells are usually provided to facilitate alignment and joining of components. Within the hollow shell is provided a mount to enable connection of the mirror housing to a vehicle bracket, which itself is attached to the side of a vehicle. In order to avoid high stresses within the plastic shell, these mounts must be designed so that they distribute load away from the mount itself. This becomes increasingly important as the wall thickness of the plastics shell is reduced.

Vehicle external mirror housings are generally made from shells having mounting and connection bosses which add to the complexity of the injection molding tooling. Furthermore, the injection molded shells, having a wall thickness of 2 to 3 millimeters take a significant time to cool resulting in a cycle time of about 50 seconds. A reduction in wall thickness not only reduces cycle times but also reduces the amount of plastics material used, reduces the cost and reduces the weight of the mirror housing.

An alternative external vehicle mirror construction for large mirrors such as those found on trucks and buses is disclosed by Canadian Patent Application No. 2198267. With this construction, a core is molded from polyurethane foam and subsequently a reinforcing layer "a few millimeters thick" is sprayed on. While this construction may have some advantages for large mirrors, it has the disadvantage that the surface finish is difficult to control with precision.

It is an object of the present invention to provide an improved vehicle external mirror that overcomes some of the problems outlined above.

SUMMARY OF THE INVENTION

According to the a first aspect of present invention, there is provided a vehicle external mirror assembly comprising a head; a mount for attaching said head to a vehicle; and a mirror; said head comprising a molded thin external plastic shell; and a foam core, said foam anchoring and supporting said shell.

Preferably the assembly further comprises a load diffuser extending laterally into said foam core from said mount, wherein, in use, loads acting on said head are transmitted through said foam to said load diffuser.

Preferably said head is pivotable with respect to said mount.

Preferably the stiffness of said diffuser reduces from adjacent said mount to its periphery.

According to a second aspect of the present invention, there is provided a vehicle external mirror assembly comprising a head; a mount for attaching said head to a vehicle; and a mirror; said head comprising an external plastic shell; a foam core, said foam anchoring and supporting said shell; and a load diffuser extending laterally into said foam core from said mount, wherein, in use, loads acting on said head are transmitted through said foam to said load diffuser.

Preferably said head is pivotable with respect to said mount.

Preferably the stiffness of said diffuser reduces from adjacent said mount to its periphery.

According to a third aspect of the present invention, there is provided a vehicle external mirror assembly comprising a head; a mount for attaching said head to a vehicle; and a mirror; said head comprising a front molded thin external plastic shell; a rear molded thin external plastic shell meeting said front shell at a joint; and a foam core, said foam anchoring and supporting said front and rear shells. The joint may be an overlapping joint or a butt joint.

According to a fourth aspect of the present invention, there is provided a vehicle external mirror assembly comprising a head; a mount for attaching said head to a vehicle; and a mirror; said head comprising a front thin external plastic shell; a rear thin external plastic shell and a foam core, the foam anchoring and supporting the shell.

Preferably the assembly further comprises a porous foam gasket sandwiched between edges of said front and rear shells.

According to a fifth aspect of the present invention, there is provided a method for manufacturing a vehicle external mirror housing, for housing a rear vision mirror, comprising the steps of molding a first thin plastic component for use as a front shell; molding a second thin plastic component for use as a rear shell;

positioning and retaining said first and second shells against each other in an edge-to-edge relationship so as to create an internal void; and substantially filling said void with foam to form a rigid assembly bonded together by said foam.

Preferably injection compression molding is used to mold both of said front and rear thin plastic components.

Preferably the method comprises a sub-step of sandwiching a porous foam gasket between the edges of said first and second shells, whereby said gasket allows the escape of air but not foam from said void.

According to a sixth aspect of the present invention, there is provided a method for manufacturing a vehicle external mirror housing, for mounting a rear vision mirror, comprising the steps of molding a pre-form component; blow molding said pre-form component into a component having the external shape of a said mirror housing; substantially filling said blow molded component with foam to form a rigid assembly.

According to a seventh aspect of the present invention, there is provided a method for manufacturing a vehicle external mirror housing, for housing a rear vision mirror, comprising the steps of molding a first thin plastic component for use as a front shell; gas assist injection molding a second thin plastic component for use as a rear shell; positioning and retaining said first and second shells against each other in an edge-to-edge relationship so as to create an internal void; and substantially filling said void with foam to form a rigid assembly bonded together by said foam.

Preferably injection compression molding is used to mold both of said front and rear thin plastic components.

Specific embodiments of the invention will now be described in some further detail with reference to and as illustrated in the accompanying figures. These embodiments are illustrative, and are not meant to be restrictive of the scope of the invention.

DETAILED DESCRIPTION OF THE DRAWINGS

A preferred embodiment is illustrated in the accompanying representations in which:

FIG. 2 shows the mirror assembly of FIG. 1 in rear view;

FIG. 3 shows the mirror assembly of FIG. 1 in side view;

FIG. 4 shows a cross sectional view of the mirror assembly of FIG. 1 through the section lines 4—4 indicated in FIG. 3;

FIG. 5 shows a cross sectional view of the mirror assembly of FIG. 1 through the section lines 5—5 indicated in FIG. 2;

FIG. 8 shows a butt joint at the interface between the front and rear shells of the mirror housing shown in FIGS. 1–5. A hidden internal spill chamber is also shown;

FIG. 9 shows a butt joint sandwiching a porous foam gasket at the interface between the front and rear shells of the mirror housing shown in FIGS. 1–5; and FIGS. 10–13 show an interdigited joint at the interface between the front and rear shells of the mirror housing shown in FIGS. 1–5.

DETAILED DESCRIPTION OF THE INVENTION

Figure 1:
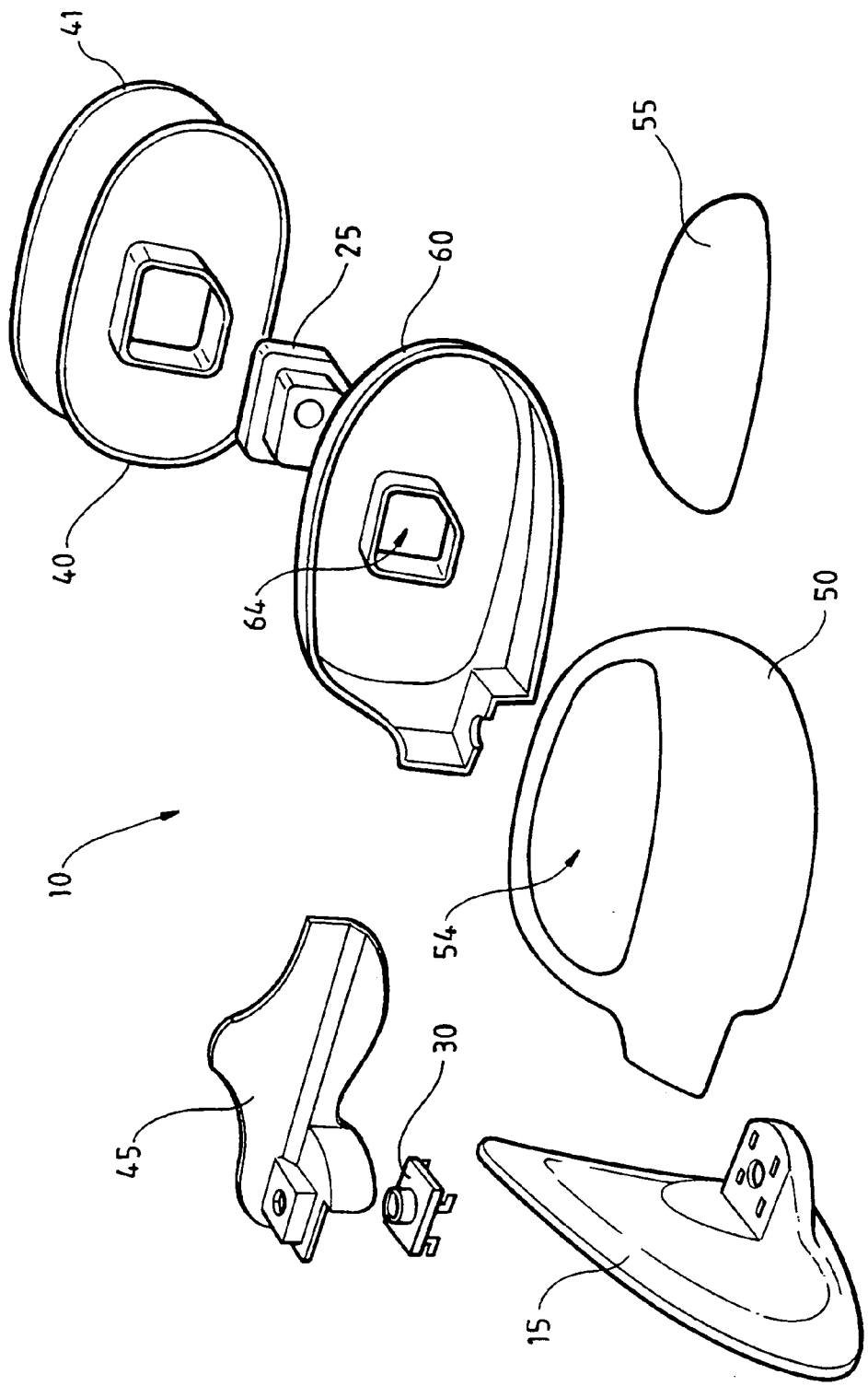
FIG. 1 shows a vehicle external side mirror assembly in an exploded view.
Figure 6:
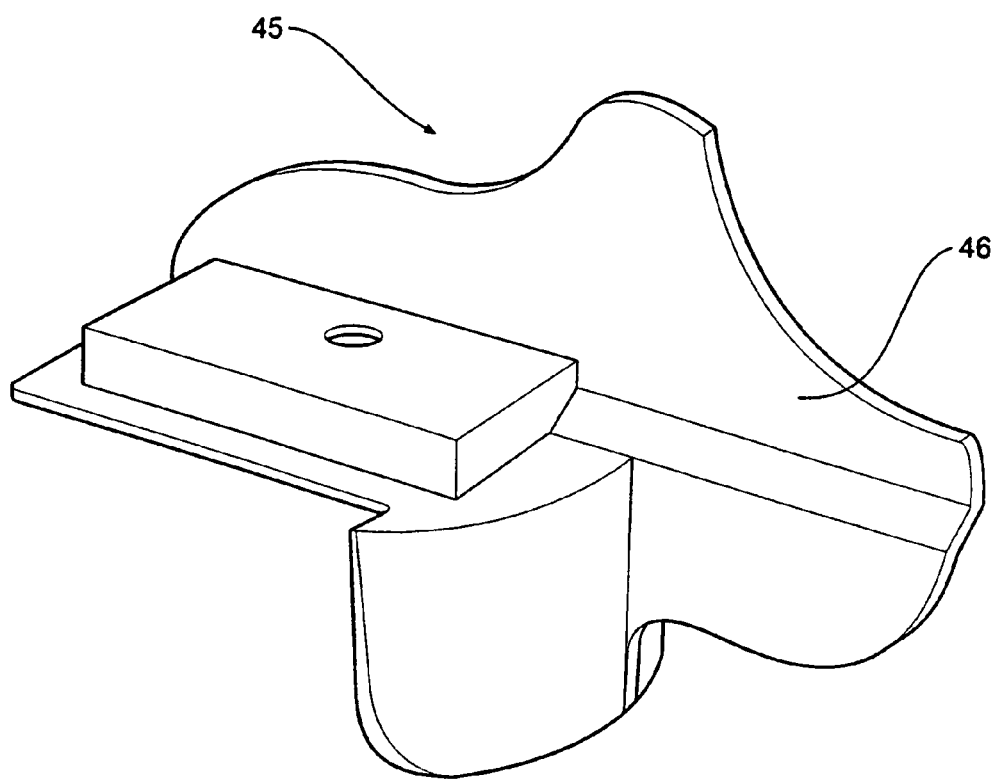
FIG. 6 shows a load diffuser for use with the assembly shown in FIG. 1.

Referring to FIG. 1, a vehicle external side mirror assembly is shown in an exploded perspective view. This mirror assembly comprises three main parts: a mount for attachment to a vehicle in the form of a vehicle-to-mirror assembly attachment bracket 15, a mirror head 20 (shown assembled in FIG. 2) and a mirror 41. Mirror 41 is mounted on a mirror surround 40 which is connected to a motor mechanism assembly 25. The motor mechanism 25 provides a means for adjusting the orientation of the mirror 41 in relation to the housing 20.

The mount/bracket 15 and mirror head 20 shown in FIGS. 1 and 2 are separate components allowing a breakaway pivot assembly to be used. In some applications where breakaway is not required mount 15 may form an integral part of mirror head 20.

Referring to the cross sectional representations of FIGS. 4 and 5, the construction of the housing is apparent. FIG. 5 shows a front molded thin external plastic shell 50 and a rear molded thin external plastic shell 60 encapsulating a polyurethane foam core 21. The foam 21 is injected into the external plastic shell halves 50 and 60 and, when cured, bonds to the internal surfaces of shell halves 50 and 60 to secure and support them.

FIG. 4, showing a cross sectional view of the mirror assembly 10 through the section lines 4—4 shown on FIG. 3, reveals a load diffuser 45. This load diffuser extends laterally into the foam core from a pivot attachment region. In use, when loads and other loads acting on the mirror housing 20 are transmitted through the foam to the load diffuser 45 and to the pivot assembly 30. The load diffuser 45 distributes forces through the foam structure thereby reducing the maximum tensile and compressive stresses within the foam 21.

The vehicle external mirror assembly 10 shown in FIGS. 1 to 5 differs from conventional mirrors in that foam 25 and 18 is used to provide a rigid structure and to adhere the various components together. This design enables the shells of both the vehicle bracket 15 and the mirror housing 20 to be considerably thinner. Conventional mirror shells are normally between 2 and 3 millimeters thick. In the embodiment shown in FIGS. 1 to 4 the wall thickness of the shells is approximately 0.7 millimeters. Because the wall thickness is reduced, the amount of plastics material used to produce an external mirror assembly is significantly reduced. Not only does this reduce the cost, it also reduces the weight of the mirror assembly.

The foam 18 and 25 used to fill the shells 17, 50 and 60 has adhesive properties which bond to the shells and thereby anchor them in position. The bonding property of the foam obviates the need for bosses and connectors between separate components.

Bonding of the foam to shells and other components can be improved by providing a rough surface finish on their internal faces. This can be achieved for instance by using a mold with a grained or matt finish.

FIG. 5 shows the joint between the edge 51 of the front shell 50 and the edge 61 of the rear shell 60. FIGS. 7 to 13 show details of various joints that may be used between these edges 51 and 61.

Figure 7:
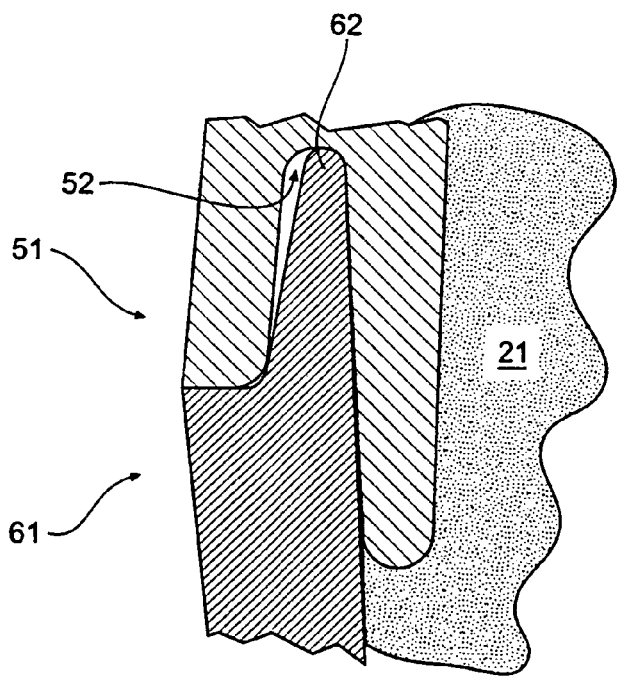
FIG. 7 shows an overlapping joint at the interface between the front and rear shells of the mirror housing shown in FIGS. 1–5.
Figure 13:
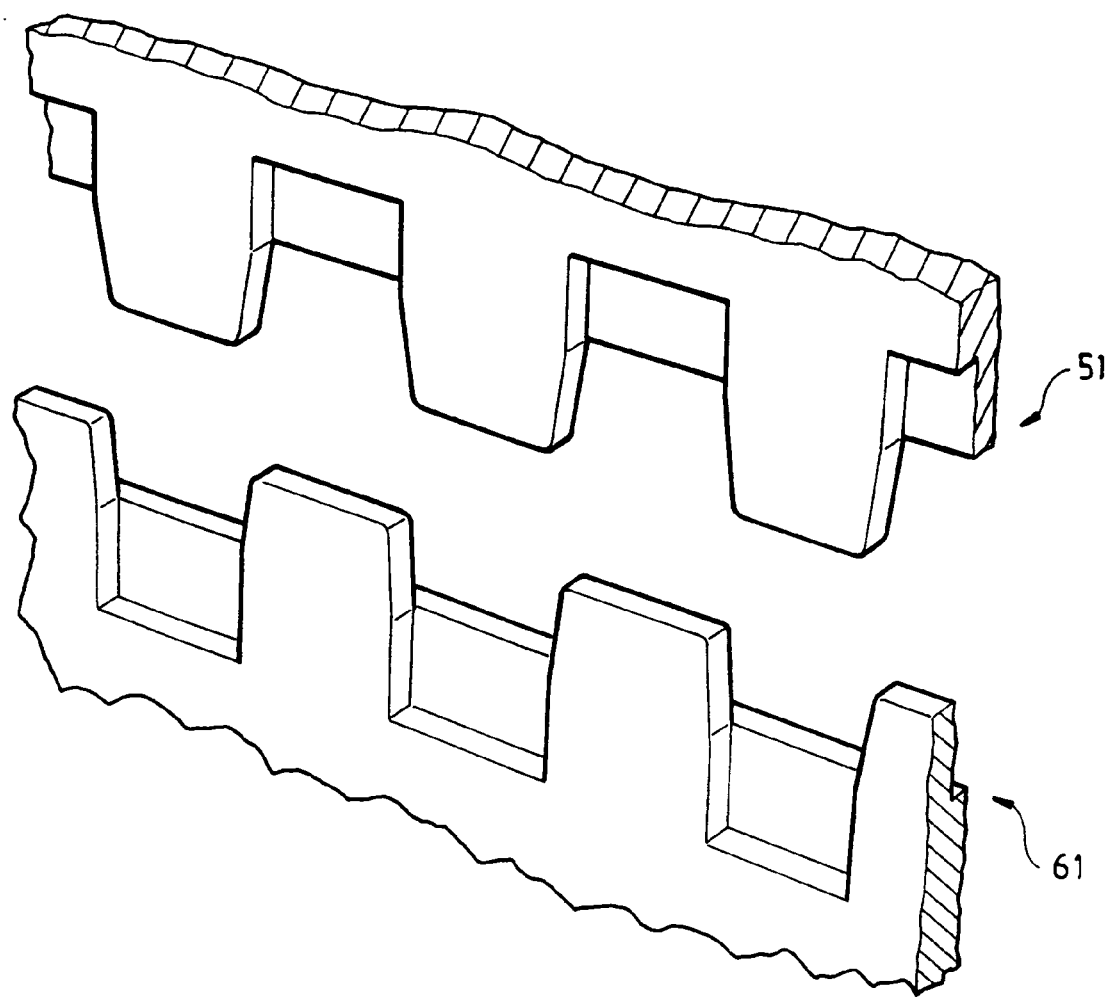

FIG. 7 shows an overlapping joint detail. The overlapping joint is formed from a projection 62 which extends from the edge 51 of the front shell 50 into a groove 52 within the edge 61 of the rear shell 60. This joint provides positive alignment of the front shell 50 to the rear shell 60 and also presents a long leakage path to foam 21. In practice this long path has been found to be sufficient to prevent any leakage of the foam 21 from inside the void created by front shell 50 and rear shell 60 to the external surface of the shells.

FIG. 8 shows an alternative jointing arrangement in which a butt joint is used. A double edge 51 abuts an edge 61 thereby forming a hidden internal chamber 57. This hidden internal chamber 57 prevents the foam 21 escaping to the exterior of the front and rear shells 50 and 60. In practice, a small amount of foam 21' will escape into the hidden internal chamber 21 but will not progress out through the joint to the exterior surface of the shells.

FIGS. 10, 11, 12 and 13 show a further alternative in the form of an interdigited joint. This joint produces a "clean" joint line on the exterior while providing a very strong and positively located joint between the front shell 50 and the rear shell 60.

FIG. 9 shows a fourth alternative jointing detail in which a foam gasket 70 is used between the edge 61 of the rear shell and the edge 51 of the front shell. The "sandwich" foam gasket 70 performs the function during manufacture of allowing air to escape from the void formed between the front shell 50 and the rear shell 60 while at the same time preventing foam escaping.

In the above described embodiment, both the vehicle-to-mirror assembly attachment bracket 15 and the mirror housing 20 are constructed from a molded thin shell anchored (secured) and supported by foam. In alternative embodiments, the bracket 15 may be constructed in the conventional way (no foam fill).

A separate colored scalp 55 as shown in FIG. 1 may be produced to fit in an aperture 54 within the front shell 50. The foam 21 acts to bond the scalp 55 securely in place. Alternatively a recess 53 may be provided in front shell 50 to accommodate a scalp which may be glued or clipped in place (refer FIG. 5). Where a detachable clip on scalp is required, access holes may be provided through the foam 21 to the rear of the mirror housing 20 (not shown).

While various plastics materials may be used to produce shell components 17, 50 and 60, ABS, ASA and polycarbonate have been found to be effective. The thickness of the plastics material can also be varied. Reduced thickness shells improves cycle times for the injection molding process and, because the foam 18 and 25 provides structural support for the mirror assembly, the rigidity and strength of the shell is of less importance. Depending on the plastic being used the thin shell will be less than 1.5 millimeters thick and usually in the range of 0.5 to 1 millimeter thick.

Various foams 18 and 21 may be used to fill the hollow shells 17, 50 and 60. Polyurethane foams are one example. The foam density, rigidity and strength properties can be varied by changing the proportion of resin and other ingredients and by selection of pressures and curing times.

Although not shown in FIGS. 1 to 5, a film laminate can cover the front shell 50. This film laminate provides an aesthetically pleasing and abrasion resistant finish to the mirror housing. By including a colored film in the film laminate, the need for painting the mirror housing is eliminated. An abrasion resistant clear film covers the colored film and forms the final external layer.

The vehicle external mirror assembly described above and depicted in FIGS. 1 to 5 is lightweight, rigid and of adequate strength. However the structure is not capable of withstanding high point loads and therefore it is necessary to ensure that the interface between pivot assembly 30 and on one side vehicle bracket 15 and on the other side mirror housing 20 is such that loads are diffused through the foam 18 and 21. Load transmitting members 16 and 45 perform this function. They extend away from pivot assembly 30 deep into the foam thereby distributing forces through the foam 18 and 21 respectively and reducing the maximum tensile and compressive stresses within the vehicle bracket 15 and external mirror housing 20.

The load transmitting members 16 and 45 can be designed so that their stiffness progressively reduces away from their connection points to the pivot assembly 30. This allows loads to be transferred from the relatively flexible foams 18 and 25 to the relatively rigid pivot assembly 30 while minimizing tensile and compressive stresses. The large surface area of load transmitting members 19 and 45 assist in ensuring a strong bond to foams 18 and 25.

A first method for manufacturing a vehicle external mirror housing, for mounting a rear vision mirror, will now be described. Firstly, two thin plastic components for use a front and rear shells are injection compression molded. Secondly, these two shells are positioned and retained against each other in an edge-to-edge relationship so as to create an internal void. Finally the aforesaid void is substantially filled with foam to form a rigid assembly bonded together by the foam. Optionally a porous foam gasket, such as the gasket 70 shown in FIG. 9, can be sandwiched between the edges of the shells before the foam is injected. Such a gasket allows the escape of air but not foam from the assembly.

Where load diffusers are to be used, they are placed between the two thin plastic shells before the foam is injected.

It has also been found effective to create an aperture within the rear shell 60 and to then place a motor mechanism assembly component 25 within the aperture before injecting the foam (refer FIG. 1). When the foam is injected it also bonds the motor mechanism assembly 25 in position.

An alternative method for manufacturing a vehicle external mirror housing, for mounting a rear vision mirror, comprises the following steps. Firstly a pre-form component is injection molded. Secondly the component is blow molded into a component having the external shape of the mirror housing. Finally the blow molded component is filled with foam to form a rigid assembly.

A further method for manufacturing a vehicle external mirror housing, for mounting a rear vision mirror, introduces gas assist injection molding techniques. In this method, a first thin plastic component for use as a front shell is injection compression molded and a second thin plastic component for use as a rear shell is injection molded using gas assistance. The gas assistance produces hollow voids within the component and speeds the cooling time for the component. Having injection molded the first and second components, they are positioned against each other in an edge-to-edge relationship so as to create an internal void. This void is then substantially filled with foam to form a rigid assembly bonded together by the foam.

While the present invention has been described in terms of preferred embodiments in order to facilitate better understanding of the invention, it should be appreciated that various modifications can be made without departing from the principles of the invention. Therefore, the invention should be understood to include all such modifications within its scope.

The claims defining the invention are as follows:

1. A vehicle external mirror assembly comprising:
   a head;
   a mount for attaching said head to a vehicle;
   a breakaway pivot assembly affixed on said mount;
   a mirror; and
   said head comprising:
      a molded thin external plastic shell;
      a foam core, said foam anchoring and supporting said shell; and
      a load diffuser pivotably connected to said breakaway pivot assembly and extending laterally into and embedded in said foam core, wherein, in use, loads acting on said head are transmitted through said foam to said load diffuser and onto said breakaway pivot assembly so that said head will rotate.

2. The vehicle external mirror assembly according to claim 1, wherein the interior surface of said shell is rough to improve adhesion to said foam.

3. The vehicle external mirror assembly according to claim 1, wherein said mount has a pivot assembly receiving portion, a vehicle body abutment and connection portion, and a body, said body comprising:
a molded thin external plastic body shell; and
a second foam core, said second foam anchoring and supporting said body shell.

4. The vehicle external mirror assembly according to claim 1, wherein the stiffness of said diffuser reduces from adjacent said mount to the periphery of said diffuser.

5. A vehicle external mirror assembly comprising:
a head;
a breakaway pivot assembly affixed on said mount;
a mount for attaching said head to a vehicle;
a mirror; and
said head comprising:
a molded external plastic shell;
a foam core, said foam anchoring and supporting said shell; and
a load diffuser pivotably connected to said breakaway pivot assembly and extending laterally into and embedded in said foam core,
wherein, in use, loads acting on said head are transmitted through said foam to said load diffuser and onto said breakaway pivot assembly so that said head will rotate.

6. The vehicle external mirror assembly according to claim 5, wherein the interior surface of said shell is rough to improve adhesion to said foam.

7. The vehicle external mirror assembly according to claim 5, where said mount has a pivot assembly receiving portion, a vehicle body abutment and connection portion, and a body, said body comprising:
a molded thin external plastic body shell; and
a second foam core, said second foam anchoring and supporting said body shell.

8. The vehicle external mirror assembly according to claim 5, wherein the stiffness of said diffuser reduces from adjacent said mount to the periphery of said diffuser.

9. A vehicle external mirror assembly comprising:
a head;
a breakaway pivot assembly affixed on said mount;
a mount for attaching said head to a vehicle;
a mirror; and
said head comprising:
a front molded thin external plastic shell;
a rear molded thin external plastic shell meeting said front shell at a joint; and
a foam core, said foam bonding said front and rear shells so that said foam will anchor and support said front and rear shells; and a load diffuser pivotably connected to said breakaway pivot assembly and extending laterally into and embedded in said foam core, wherein, in use, loads acting on said head are transmitted through said foam to said load diffuser and onto said breakaway pivot assembly so that said head will rotate.

10. The vehicle external mirror assembly according to claim 9, wherein said joint is an overlapping joint.

11. The vehicle external mirror assembly according to claim 10, wherein said overlapping joint is formed from a projection, extending from the edge of one of the front or rear shells, received within a groove within the edge of the other one of said front or rear shells.

12. The vehicle external mirror assembly according to claim 9, wherein said joint is a butt joint.

13. The vehicle external mirror assembly according to claim 12, further comprising a hidden internal chamber formed between edges of said front and rear shells for preventing foam from escaping to the exterior of said shells.

14. The vehicle external mirror assembly according to claim 13, wherein at least one of said front and rear shells terminates in parallel double edges to provide a double butt joint against the other of said front and rear shells, thereby forming said hidden internal chamber.

15. The vehicle external mirror assembly according to claim 11, further comprising a load diffuser extending laterally into said foam core from said mount,
wherein, in use, loads acting on said head are transmitted through said foam to said load diffuser.

16. The vehicle external mirror assembly according to claim 15, wherein the interior surface of both said front and rear shells is rough to improve adhesion to said foam.

17. The vehicle external mirror assembly according to claim 16, where said mount has a pivot assembly receiving portion, a vehicle body abutment and connection port, and a body, said body comprising:
a molded thin external plastic body shell; and
a second foam core, said second foam anchoring and supporting said body shell.

18. The vehicle external mirror assembly according to claim 17, wherein the stiffness of said diffuser reduces from adjacent said mount to its periphery.

19. A vehicle external mirror assembly comprising:
a head;
a mount for attaching said head to a vehicle; and
a mirror;
said head comprising:
a front thin external plastic shell;
a rear thin external plastic shell;
a foam core, the foam anchoring and supporting the shell;
a porous foam gasket sandwiched between edges of said front and rear shells; and a load diffuser extending laterally into and embedded in said foam core from said mount, wherein, in use, loads acting on said head are transmitted through said foam to said load diffuser.

20. The vehicle external mirror assembly according to claim 19, wherein said housing is pivotable with respect to said mount.

21. The vehicle external mirror assembly according to claim 20, wherein the interior surface of both said front and rear shells is rough to improve adhesion to said foam.

22. The vehicle external mirror assembly according to claim 19, where said mount has a pivot assembly receiving portion, a vehicle body abutment and connection portion, and a body, said body comprising:
a molded thin external plastic body shell; and
a second foam core, said second foam anchoring and supporting said body shell.

23. The vehicle external mirror assembly according to claim 19, wherein the stiffness of said diffuser is reduced as said diffuser extends away from said mount.

24. A vehicle external mirror assembly comprising:
a head;
a mount for attaching said head to a vehicle; and
a mirror;

said head comprising:
  a front molded thin plastic shell;
  a rear molded thin external plastic shell meeting said front shell at a butt joint;
  a foam core, said foam anchoring and supporting said front and rear shells;
  a hidden internal chamber formed between edges of said front and rear shells for preventing foam from escaping to the exterior of said shells; and a load diffuser extending laterally into and embedded in said foam core from said mount, wherein, in use, loads acting on said head are transmitted through said foam to said load diffuser.

25. The vehicle external mirror assembly according to claim 24, wherein at least one of said front and rear shells terminates in parallel double edges to provide a double butt joint against the other of said front and rear shells, thereby forming a hidden internal chamber.

26. A vehicle external mirror assembly comprising:
  a head;
  a mount for attaching said head to a vehicle; and
  a mirror;
  said head comprising:
    a front molded thin external plastic shell;
    a rear molded thin external plastic shell meeting said front shell at an overlapping joint formed from a projection, extending from the edge of one of the front or rear shells, received within a groove within the edge of the other one of said front or rear shells;
    a foam core, said foam anchoring and supporting said front and rear shells; and
    a load diffuser extending laterally into and embedded in said foam core from said mount, wherein, in use, loads acting on said head are transmitted through said foam to said load diffuser.

27. The vehicle external mirror assembly according to claim 26, wherein the internal surface of both said front and rear shells is rough to improve adhesion to said foam.

28. The vehicle external mirror assembly according to claim 27, wherein said mount has a pivot assembly receiving portion, a vehicle body abutment and connection port, and a body, said body comprising:
  a molded thin external plastic body shell; and
  a second foam core, said second foam anchoring and supporting said body shell.

29. The vehicle external mirror assembly according to claim 28, wherein the stiffness of said diffuser reduces from adjacent said mount to its periphery.

30. A vehicle external mirror assembly comprising:
  a head;
  a mount for attaching said head to a vehicle;
  a mirror;
  said head comprising:
    a front molded thin external plastic shell;
    a rear molded thin external plastic shell meeting said front shell at a butt joint;
    a foam core, said foam bonds said front and rear thin external plastic shell so that said foam anchors and supports said front and rear thin external plastic shells;
    a hidden internal chamber formed between edges of said front and rear shells for preventing foam from escaping to the exterior of said; and a load diffuser extending laterally into and embedded in said foam core from said mount, wherein, in use, loads acting on said head are transmitted through said foam to said load diffuser shells.

31. The vehicle external mirror assembly according to claim 30, wherein at least one of said front and rear shell terminates in parallel double edges to provide a double butt joint against the other of said front and rear shells, thereby forming said hidden internal chamber.

32. A vehicle external mirror assembly comprising:
  a head;
  a mount for attaching said head to a vehicle;
  a mirror;
  said head comprising:
    a front molded thin external plastic shell;
    a rear molded thin external plastic shell, wherein said at least one of said front and rear shells terminates in parallel double edges to provide a double butt joint against the other of said front and rear shells, thereby forming said hidden internal chamber;
    a foam core, said foam core anchoring and supporting said front and rear shells;
    a hidden internal chamber formed between edges of said front and rear shells for preventing foam from escaping to the exterior of said; and a load diffuser extending laterally into and embedded in said foam core from said mount, wherein, in use, loads acting on said head are transmitted through said foam to said load diffuser shells.

* * * * *